United States Patent [19]

Gagnon et al.

[11] 4,219,737
[45] Aug. 26, 1980

[54] SELF REGULATING MICROFILM FRAME DETECTION CIRCUIT

[75] Inventors: Richard T. Gagnon, Rochester; Stephen C. Horste, Ann Arbor, both of Mich.

[73] Assignee: Visual Systems Corporation, Southfield, Mich.

[21] Appl. No.: 970,228

[22] Filed: Dec. 18, 1978

[51] Int. Cl.² ............................................. G06K 7/14
[52] U.S. Cl. ............................... 250/570; 250/214 B; 353/26 A
[58] Field of Search ............. 353/26 A; 250/570, 557, 250/505, 214 B, 561, 568; 355/41; 307/359

[56] References Cited

U.S. PATENT DOCUMENTS

| | | | |
|---|---|---|---|
| 3,328,590 | 6/1967 | C. B. Kapsambelis | 250/214 B X |
| 3,660,670 | 5/1972 | Howard | 250/561 |
| 3,789,215 | 1/1974 | Penny | 250/555 X |
| 4,027,154 | 5/1977 | Flint | 250/557 X |

FOREIGN PATENT DOCUMENTS 2736297 2/1979 Fed. Rep. of Germany ....... 250/214 B

Primary Examiner—David C. Nelms
Assistant Examiner—Edward P. Westin
Attorney, Agent, or Firm—Cullen, Sloman, Cantor, Grauer, Scott & Rutherford

[57] ABSTRACT

A system for optically detecting the presence of indicating markers on microfilm frames and for ignoring stray marks and smudges. As light shines through the microfilm and is detected by a photo-transistor, the system self regulates to provide an absolute baseline value, called a prescaler, for each frame of microfilm. Then, as each mark appears on the microfilm and interrupts the light path to the photo-transistor, the degree or extent of light blockage is measured as a deviation from the baseline for that frame. If the deviation exceeds a predetermined threshold, the mark is counted as a marker; otherwise the mark is ignored as a stray spot or smudge. The threshold is also self regulated based on a percentage of the amount that the light blockage of the marker in the immediately preceding frame deviated from the baseline for that frame.

13 Claims, 5 Drawing Figures

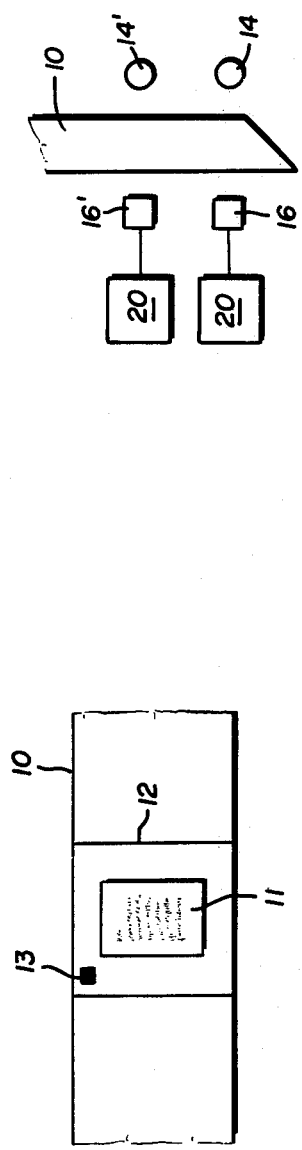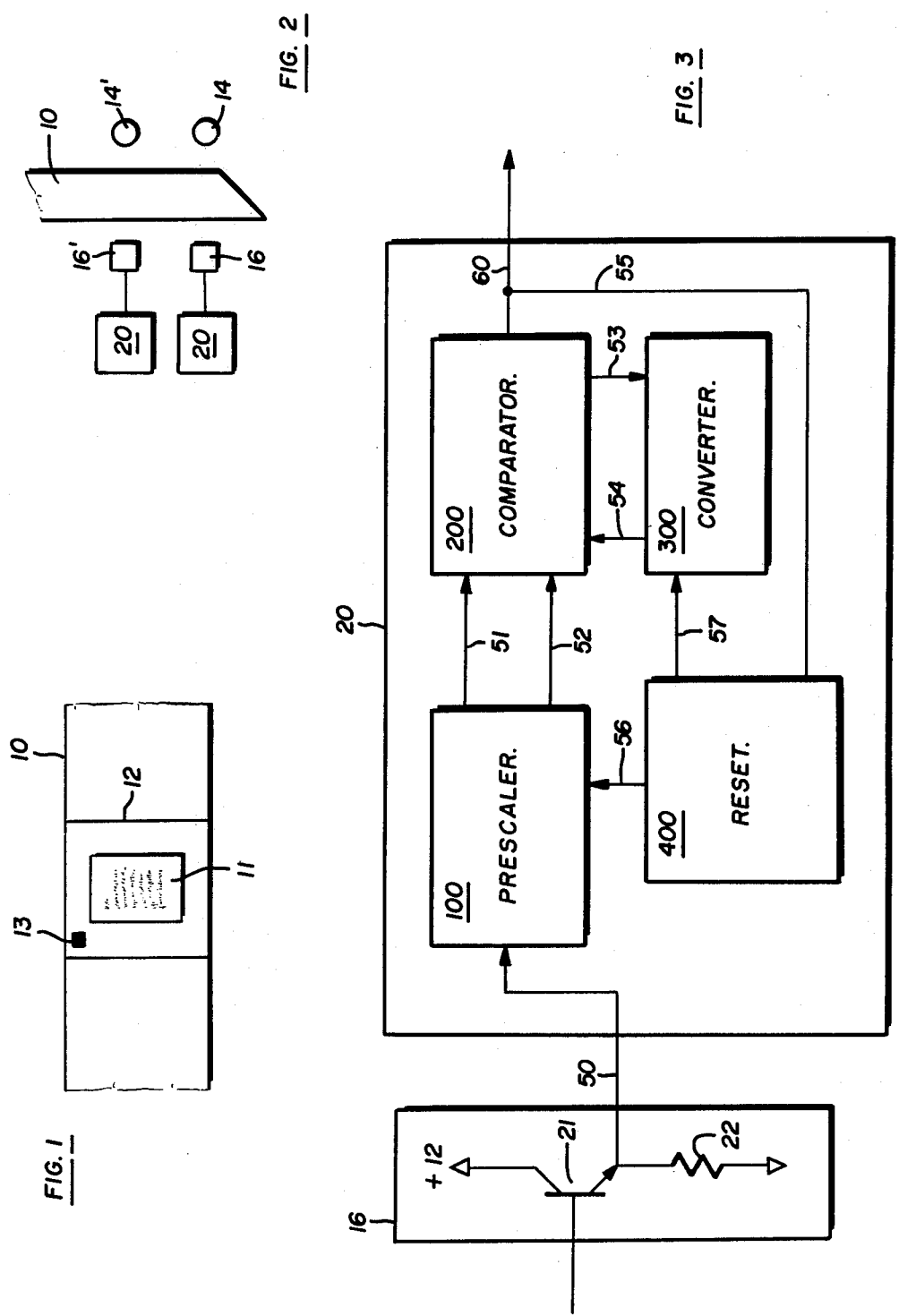

SELF REGULATING MICROFILM FRAME DETECTION CIRCUIT

BACKGROUND OF THE INVENTION

This invention relates generally to equipment for retrieving data from documents which have been recorded on individual frames of a reel of microfilm. More particularly, the present invention relates to a technique for accurately counting the frames on a reel of microfilm so that the people using the microfilm reader can quickly and automatically stop the microfilm reader at a particular frame to extract data from the document recorded on that frame.

In the initial recording of documents on microfilm it is common to have each page of the document recorded on a separate frame of the film. Hence each frame of the microfilm corresponds to a single page of the document. Typically the microfilm apparatus places a dark spot, called a marker or "blip," on each frame of the film. Then an index is prepared identifying the document and indicating the frame on which the document is recorded.

Since each reel of microfilm may have several thousand frames, it may be appreciated that when it becomes necessary to look at a particular frame of the microfilm, to study a specific document, it will be desirable to be able to quickly advance the microfilm through the microfilm reader and to stop the microfilm automatically at the frame on which the particular document has been recorded.

The advancing of the microfilm to locate a particular document is called "scanning" or "searching." Devices already exist for automatically advancing the microfilm through a reader and for counting the markers or blips on the frames in an attempt to scan or search and automatically stop at the desired document. It may be appreciated, however, that if the scanning operation is incorrect by even one or two frames, then the person operating the microfilm reader, if unskilled at recognizing and analyzing the specific document, may relay on information from the wrong document, because the operator will not know that the microfilm system has automatically stopped at the wrong document.

In the recording of documents on microfilm, with each page being recorded on an individual frame of the film, the frame blips or markers are placed near the edge of the film to avoid interference or overlap with the text of the recorded document itself. Since most microfilm readers rely on a photoelectric system for detecting the frame markers, the markers are typically black spots on the edge of the film—one spot or marker for each frame.

The photoelectric system usually comprises a light source on one side of the film and a phototransducer on the other side of the film. The transducer is a photo-transistor which generates a current depending upon the amount of light received from the light source and passing through the microfilm. When a frame marker appears in the path of the photoelectric system, the marker interrupts or blocks the light to the photo-transistor and thus the output of the photo-transistor, i.e., the current generated by the photo-transistor, changes to indicate that a marker has moved between the light source and the photo-transistor. This should indicate that another frame of the microfilm has moved through the microfilm reader.

However, if smudges, fingerprints or stray marks appear on the microfilm near the edge of the film, the light to the photo-transistor will be interrupted which also changes the output from the photo-transistor. Hence this would falsely indicate a frame marker.

Thus one drawback of the optical system of the prior art is the false marker problem which can arise because of smudges, marks or fingerprints on the microfilm. This may give rise to false "countings" and distort the entire scanning or search operation.

Another difficultly with the optical systems of the prior art is the insufficient optical "contrast" between the darker frame marker and the lighter remaining portion of the microfilm frame. This may be caused by one or more factors including the decrease in illumination from the light source caused by age, dirt, etc., the type of microfilm, general quality of the microfilm and quality of the original document. This factor is called the "baseline" of the microfilm which is a measure of the actual light passing through the microfilm and received by the photo-transistor. It is clear that if the general light reception becomes diffused or dim, there may be a failure to detect the frame markers since there may be insufficient optical contrast between the marker and the background.

There are, of course, many prior art techniques for counting frame markers in microfilm reader systems. These techniques, however, have neither recognized nor inherently solved the aforementioned problems. Such prior art techniques, in general, take the analog output from the photo-transistor and compare such analog output with an analog representation of the background light. This comparison, in analog form, is typically accomplished in the prior art by a log or radio comparator which basically subtracted the logarithm of the background light value from the logarithm of the marker light value. At low levels of light, the difference between these two values became smaller and would not exceed the threshold necessary to recognize a frame marker, thus frame markers would be erroneously ignored. These low light levels as previously discussed may be caused by a variety of operating-related defects due to age or dirt on the light source or film. Thus the log or ratio method does not reflect real-life conditions of the photoelectric system such as changing light value or quality of film.

Thus the present invention overcomes the problems of the prior art by ignoring stray marks, smudges, and the like and by adjusting for changing conditions of the light source and the film.

SUMMARY OF THE INVENTION

The present invention is a system for optically detecting the presence of markers on a microfilm frame and for distinguishing between bona fide markers and stray smudges. This is accomplished, according to the present invention, by two self-regulating features.

The first self-regulating feature of the present invention is a prescaling technique to provide an absolute baseline value, or background signal, for each microfilm frame based upon the true light intensity and adjusting this background signal to a desired value. Thus the baseline value is independent of light source deterioration, film quality, and the other variables of the system.

A frame marker is then detected based on the amount of light blockage relative to the "baseline." This is called the "deviation."

The second self-regulating feature of the present invention involves comparison of the deviation of a marker with a variable threshold. If the deviation equals or exceeds the threshold, then the marker is counted. The threshold is related to the marker deviation of the immediately preceding frame to aid in determining whether or not the signal represents a marker or a false signal such as a fingerprint or smudge on the film.

The present invention provides a reliable means for recognizing markers on microfilm while ignoring stray marks. The prescaling self-regulating feature is particularly important with regard to obtaining a consistent baseline or standard of comparison. Not only does this prescaler set a baseline regardless of ambient light conditions due to the film itself, but also regardless of the condition of the light source. In other words, no matter how much "frost" is on the inside of the light source due to age or how much filament deposition is on the interior of the light or how much dust is on the exterior of the light source from non-use, the baseline value is automatically scaled to a desired value. With this self-regulating prescaler, the input current is simply multiplied until a predetermined baseline value is reached. Obviously the weaker the light source, the greater degree of multiplication is provided automatically by the present system.

The present invention may be utilized with a microprocessor or other software control and provision is made for resetting the circuit externally as well as automatically. Furthermore, because of the unique comparison and reset feature of the present invention, the operator using this system may leave the system on and return sometime later and the "deviation" of the immediately preceding marker will still automatically be maintained internally by the circuit so that the deviation of the next marker optically detected will be compared to the deviation of the last marker which was counted.

The present invention may be used whether the film is a positive image or a negative image film. The circuit measures light deviation and it does not matter whether the marker is a representation of more light or of a blockage of light. Furthermore, the start-up procedure of the circuit provides a comparison standard for the first marker by having a minimum voltage deviation from the baseline of the prescaler circuit which the first marker must exceed in order to be counted. Once the first marker is counted, two-thirds of the value of the deviation of that marker from the baseline is used as the standard of comparison for authentication of the next marker.

BRIEF DESCRIPTION OF THE DRAWINGS

The various objects and advantages of the present invention will become more apparent upon reading the following detailed description of the invention taken in conjunction with the drawings. In the drawings:

FIG. 1 illustrates a portion of microfilm with a document and frame marker recorded on the microfilm;

FIG. 2 illustrates diagrammatically the microfilm moving between light sources and photodetectors;

FIG. 3 illustrates in block diagram form the circuit of the present invention;

DETAILED DESCRIPTION OF THE INVENTION

Figure 4:
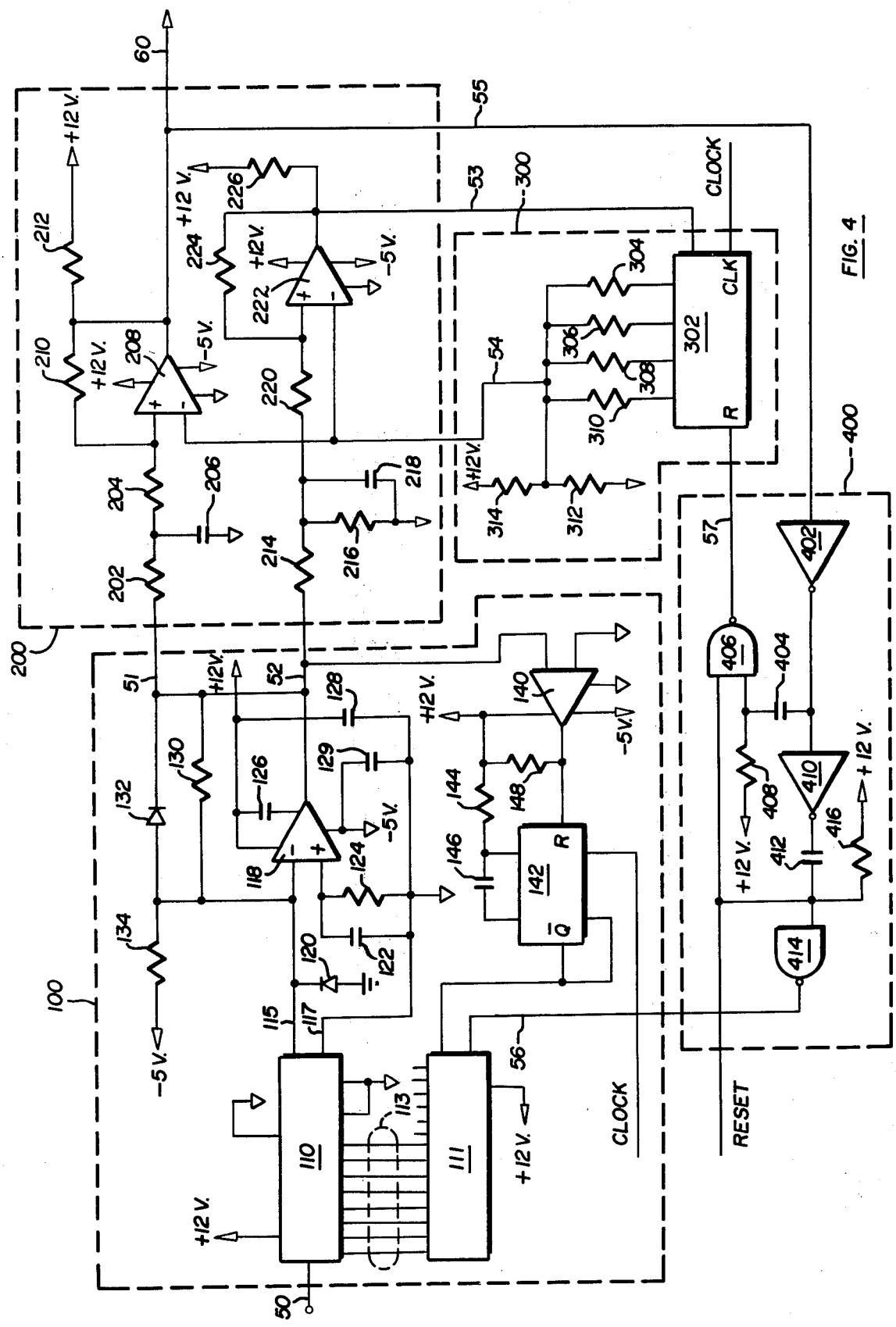
FIG. 4 is a circuit schematic diagram of the marker detection circuit of the present invention.

To understand, generally, the present invention, reference should be had to FIG. 1 which illustrates a portion of the microfilm 10 having a document 11 recorded generally in the central region of a frame 12. A frame marker 13 is positioned at the edge of the microfilm 10. Although this is a typical location for the marker 13, the only requirement as to location is such that the marker must pass between a light source and the photo-transducer as the film moves in either direction without the marker interfering with the text on the recorded document.

To further illustrate this aspect of the system, FIG. 2 shows the microfilm 10 interposed between light source means and photo-detector means. Specifically, two light sources 14,14$^1$ are positioned on one side of the microfilm 10 and two photo-detectors 16,16$^1$ are positioned on the opposite side of the film. Each photo-detector is connected to a circuit 20 of the present invention. The use of two systems is necessitated by the need for counting in either direction of film movement and also to determine the direction in which the film is moving. Elaborating on this point, it may be appreciated that if the film is moving from the lower number frame markers toward the higher number frame markers, then it would be necessary to increment a counter whereas if the film were being rewound, it would be necessary to decrease the frame marker counter each time a frame marker was detected. The circuitry of the present invention, by providing two adjacent light sources and photo-detectors, will indicate which of the two photo-detectors is the first in time to detect the frame marker and this, of course, will indicate the direction of advancing of the microfilm. However, the circuitry 20 for each of the two photo-detectors is the same and for purposes of simplification only one such circuit will be explained.

FIG. 3 illustrates, in block diagram form, the marker detection circuit 20 of the present invention. This includes a photo-detection circuit 16 having a photo-transistor 21 which has its collector coupled to a source of positive potential and its emitter connected through a resistor 22 to system ground. The output of the photo-detection circuit 16 is taken from the emitter of the photo-transistor 21 and connected by a lead 50 to the detection circuit 20 of the present invention.

The circuit 20 includes four major components: a prescaler circuit 100, a comparator circuit 200, a digital-to-analog converter circuit 300, and a reset circuit 400. In general terms, the output from the photo-detector circuit 16 is fed on lead 50 to the input of the prescaler circuit 100 which processes the signal received and establishes a baseline signal independent of the level of the input current along lead 50. When a marker is detected, this varies or deviates the signal along lead 50 from the value of the baseline signal and the comparator circuit 200 detects the amount of the deviation or variation and compares such deviation to two-thirds of the deviation of the immediately preceding marker which is stored in the digital-to-analog converter circuit 300.

If this deviation of the present marker exceeds two-thirds of the deviation of the immediately preceding marker, the comparator circuit 200 generates an output signal, on lead 60, indicating the presence of a valid marker.

In addition, the leading edge of the newly detected marker starts the generation of a new value in the digital-to-analog converter circuit 300 and the trailing edge of a valid marker provides an output which triggers the reset circuit 400 to thus reset the prescaler circuit 100 to start a new prescaling operation.

With reference to FIG. 4, the circuit of the present invention will now be explained. The signal along lead 50 from the photo-detector circuitry 16 is fed to a multiplying digital-to-analog converter 110, such as an AD7520NJ whose digital input is supplied by a ripple counter 111 such as a CD4040BE via a bit feed line 113. The multiplying digital-to-analog converter 110 is shown in detail in FIG. 5 where the incoming current is selectively multiplied by a series of resistive elements.

Figure 5:
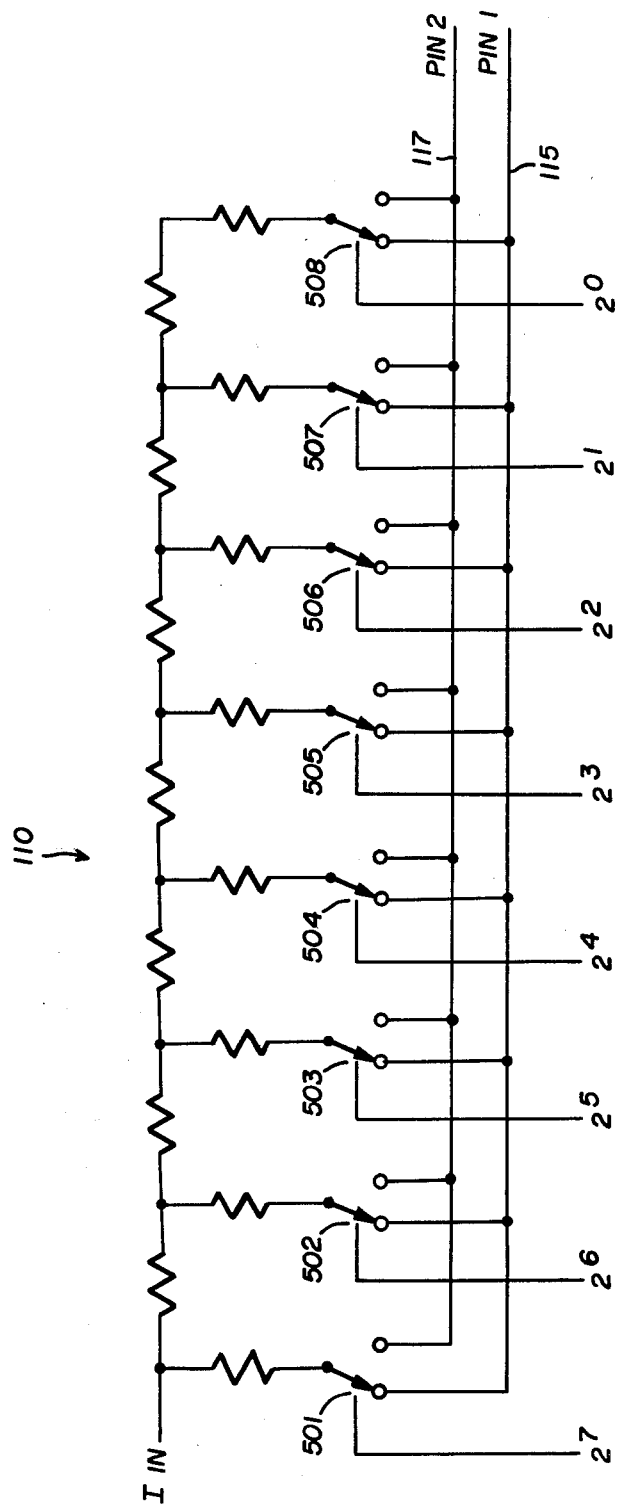
FIG. 5 is a circuit schematic diagram of the multiplying digital-to-analog converter of the circuit of FIG. 4.

Specifically, as shown in FIG. 5, the incoming current is fed to a resistance ladder having eight lines each including a switch 501 through 508 respectively. Each switch has a first or a pin 1 position 115 which is grounded and a second or pin 2 position 117 which represents multiplication of the input signal. Each of the eight lines has a binary representation from $2^0$ to $2^7$, respectively, indicative of the degree of multiplication of the input current.

For example, if only switch 508 is in the pin 2 position, the increment of current added will be small and will produce a small step increase. Because a negative gain voltage amplifier is included in the circuit, the increment and current produced by the multiplying digital-to-analog converter 110 will be a decrease instead of an increase. As the counter continues to produce more output to the multiplying digital-to-analog converter 110, more switches are thrown to the pin 2 position such that the output contribution of current increases until the baseline value is reached. The multiplying digital-to-analog converter of the present invention may be any of the integrated circuit types such as the AD7520 or the AD7523. The resistance ladder arrangement used in this particular multiplying digital-to-analog converter is called an R-2R ladder arrangement.

Referring back to FIG. 4, the output current on lead 117 (pin 2) from the digital-to-analog converter 110 is fed to ground. The operational amplifier 118, which functions as a current-to-voltage converter, has a diode 120 connected between the input lead 115 and ground to remove spurious signals. The input to the amplifier or converter 118 includes the parallel combination of a capacitor 122 and a resistor 124 which equalize the bias current offset to the amplifier 118. A positive 12 volt supply is filtered through a power supply bypass capacitor 126 to the amplifier and a capacitor 128 to ground, and a minus 5 volt supply is filtered through a power supply bypass capacitor 129 to ground.

A feedback circuit for the amplifier 118 includes the parallel combination of resistor 130 and diode 132 coupled between the output and input of the amplifier 118 which provides both feedback and baseline stabilization.

A minus 5 volt supply is fed to resistor 134 which in turn is connected to the input of amplifier 118 and this signal is summed with the output from the digital-to-analog converter 110 until a zero baseline value is reached. Of course the output of the amplifier 118 provides zero baseline value as a voltage rather than as a current.

The output from the amplifier 118 is fed to a comparator 140 to produce a reset signal to a monostable multivibrator 142. The monostable multivibrator 142 clocks the ripple counter 111 until stopped by the reset signal from the comparator 140 and the ripple counter, when stopped, stores the value in the counter. A pulse generator for the multivibrator 142 is provided including a resistor 144 connected between a positive 12 volt supply and a capacitor 146. A resistor 148, connected between the plus 12 volt supply and the output of the comparator 140, functions as a pull-up resistor for the comparator 140.

This completes the description of the prescaler circuit 100. The operation of this portion of the circuit will now be summarized. The prescaler circuit 100 uses a multiplying digital-to-analog converter which multiplies the input current from the photo-transistor in a series of steps determined by the content of the ripple counter. The ripple counter continues to count, as pulsed by a multivibrator, until stopped automatically when the output from the prescaler circuit reaches the desired baseline value. The output circuit from the digital-to-analog converter is fed to a current-to-voltage amplifier which provides, as one output, the signal to a comparator. It is this comparator which determines when to stop and hold the value in the ripple counter. Once this value has been set, thus establishing the self-regulated prescaling factor for the particular frame of microfilm, the output signal from the photo-transistor is multiplied by such value. Thus any deviation from the baseline caused by a marker is multiplied by the same value which has been used to self regulate the baseline by the background prescaler for that particular frame. It is not until the counter receives a reset signal, which will be described later, that the multiplying digital-to-analog converter including the ripple counter start over again establishing a prescaler for the next frame of microfilm.

Having thus summarized the description of the prescaler circuit, the output from the prescaler circuit fed along two parallel leads 51, 52, from the current-to-voltage amplifier 118 to the comparator circuit 200 which processes the two signals differently. One output from amplifier 118, along lead 51, goes through a filter comprising the combination of series resistors 202 and 204 which have a capacitor 206 connected between the junction of the two resistors and ground. The filtered output from the resistor 204 is connected to the positive or high input of a comparator 208 which comparator includes a feedback loop including a resistor 210 between the output and the positive input of the comparator 208. A 12 volt power supply signal is connected through a pull-up resistor 212 to the feedback loop at the comparator output.

The other output from the amplifier 118, along lead 52, is fed to a voltage divider circuit formed by a resistor 214 and the parallel combination of a resistor 216 and a capacitor 218. The value of the resistors is such that the output from the voltage divider, which is fed through a resistor 220 to the positive input of a comparator 222, is two-thirds of the output from the amplifier 118. The comparator 222 is also conditioned with a positive feedback through a resistor 224 from its output to its positive input. Furthermore, there is a plus 12 volt supply connected through a pull-up resistor 226 to the output of the comparator 222.

The operation of the comparator circuit 200 will now be explained. When the output signal from the prescaler circuit 100 is fed to the comparator circuit 200, a steady-state condition is established until there is a deviation in the prescaler output which is caused by a marker on the microfilm. This deviation is fed along lead 51 to the comparator 208. If the difference between the positive and negative inputs to the comparator exceeds a predetermined threshold, then a positive output signal is provided on lead 60 indicating that a marker should be counted. This predetermined threshold, as previously mentioned, is equal to two-thirds of the value of the marker deviation from the immediately preceding frame. This two-thirds value is provided by the digital-to-analog converter circuit 300 to the negative input of the comparator 208 as will be explained in greater detail.

Simultaneously, the deviation of the marker is fed along lead 52 from the prescaler circuit through a voltage divider network to the comparator 222 to provide a two-thirds reference deviation for use in the next subsequent microfilm frame. This output signal from the comparator 222 along lead 53 will be explained in the context of the converter circuit 300.

The output from the comparator 222 is fed along lead 53 to the digital-to-analog converter circuit 300 and specifically to the enable input of a four-stage up-counter 302 which forms the basis of the digital-to-analog converter circuit 300. The counter 302 has four output resistors 304, 306, 308, 310 in an R-2R-4R-8R configuration to produce an analog voltage output equivalent to the counter value. This analog voltage equivalent is summed with a base contribution from a plus 12 volt source fed to a divider network formed by resistors 312 and 314. The resistors 312 and 314 are connected together with the opposite side of resistor 312 grounded and the opposite side of resistor 314 connected to the plus 12 volt supply. The summation signal is provided along lead 54 as the negative input to both comparators 208 and 222. This provides the signals back to the comparator as previously explained.

More specifically, the output from the digital-to-analog circuit is a signal having a value of two-thirds of the deviation of the immediately preceding marker. Since this value is fed to the comparator 208, if the deviation in the next frame, of its marker, exceeds the two-thirds value at the negative input to the comparator 208, then a marker is recognized providing an output signal on lead 60. If this deviation does not exceed the two-thirds value at the negative input, then no marker is generated. Simultaneously, the two-thirds value is fed to the negative input of the comparator 222 while the voltage divider network provides the positive input to comparator 222 to readjust the output of comparator 222 and thus readjust the value in the counter 302 of the digital-to-analog converter circuit 300 for the succeeding frame.

The output signal 60 indicative of a marker is also coupled via lead 55 to the reset circuit 400 to provide a signal to invertor 402 which in turn presents an output signal through a capacitor 404 to the input of a Schmidt trigger controlled NAND gate 406. The output signal from the inverter 402 also serves as the input to an inverter 410 having its output coupled through a capacitor 412 to the input of another Schmidt trigger-controlled NAND gate 414. A plus 12 volt supply through a pull-up resistor 416 serves as the bias for the input signals to the NAND gate 414 and a 12 volt supply through a resistor 408 biases the input signal to the NAND gate 406. The output of the NAND gate 414 resets the ripple counter 111, along lead 56, and the output of the NAND gate 406 resets the counter 302 on lead 57. The other inputs to the NAND gates are used to permit external resetting of the counters. This completes the description of the circuit and the operation of the present invention will now be summarized.

OPERATION

Initially, when the apparatus is turned on, the counters etc. are all reset. The light received by the photodetector circuit through the film provides a signal along lead 50 to be automatically prescaled. The current along lead 50 is supplied to the digital-to-analog converter 110 whose digital signal is supplied by the ripple counter 111. The ripple counter is clocked by the monostable multivibrator 142 to increase the count in the ripple counter and the contents of the ripple counter 111 multiply the input signal to the converter 110 in increments timed by the clock input to the ripple counter. Amplifier 118 acts as an inverting current-to-voltage converter. When no current is supplied from the output of the converter 110, the input to the amplifier 118 is the negative contribution from the minus 5 volt power supply which is converted to a plus 5 volt level which is the starting point to which contributions from the converter 110 are added. Because of the minus gain factor of the amplifier 118, the output voltage of the circuit will be lowered by the input signal from the maximum starting point. When the output of the voltage goes below zero, which is the "baseline," the output voltage of the circuit will be stepped up until it crosses zero volts.

Once the baseline or zero value has been set, the deviation from the baseline caused by the marker is the output from the amplifier 118 along leads 51 and 52. This provides the output signal in parallel paths to the comparator circuit 200. Comparator 208 compares the deviation with the "threshold" and if the deviation equals or exceeds the threshold then an output signal is provided along lead 60 indicative of a valid marker.

The output of amplifier 118 along lead 52 also is fed to the two-thirds divider network and to the comparator 222. Upon the leading edge of an output signal along lead 60 indicating the presence of a marker, the reset circuit 400 is triggered. The trailing edge of the output signal along lead 60 resets the counter for the prescaler since the two-thirds value counter 302 must be reset before the prescaling counter 111 in order to store the threshold value to be used as the comparison for the subsequent frame. Therefore, the prescaler circuit 100 must hold its multiplying value in the ripple counter 111 until after the two-thirds counter 302 has reached its new value.

In the event that the marker being looked at is in the very first frame, a voltage is provided from the 12 volt source through resistor 314 and along lead 54 into the comparator circuit 200. This produces a start-up reference voltage for use in comparing the deviation of the first marker. This signal also provides the inverted input to the comparator 222 for the two-thirds threshold value for the next frame.

The output of comparator circuit 208 is used to reset counters 111 and 302 as previously mentioned. The leading edge of the output along lead 60 causes inverter 402 to go low which in turn causes gate 406 to go high thus resetting the counter 302. The negative going or trailing edge of the output on lead 60 causes the inverter 410 to go low thus causing gate 414 to go high resetting the ripple counter 111 along lead 56. This allows the next frame to be prescaled automatically by the digital-to-analog converter 110 as well as allowing the reference digital-to-analog converter circuit 300 to store a two-thirds value from the previous marker for comparison with the next marker signal.

The foregoing is a complete description of a preferred embodiment of the present invention including its operation. Various changes and modifications may be made by those skilled in the art. The invention, therefore, should be limited only by the spirit and scope of the following claims.

What is claimed is:

1. In a system for a microfilm scanner or the like wherein the microfilm passes between a light source and a photo-detector, providing an output in response to the light received from said light source, the improvement of a self-regulating marker detection circuit comprising:

prescaler means for converting the output of said photo-detector when no marker is detected to a baseline value independent of the amount of light received by said photo-detector; and comparator means for comparing the deviation in the output of said photo-detector from said baseline caused by the presence of a dark spot on a frame of microfilm and for indicating the existence of a marker if the deviation from the baseline exceeds a threshold;

said threshold being a function of the deviation from the baseline of the immediately preceding marker.

2. The invention of claim 1 wherein said threshold is automatically set to a value of two-thirds of the deviation from the baseline of the immediately preceding marker.

3. The invention of claim 1 wherein said prescaler means includes a multiplying digital-to-analog converter for converting the photo-detector output to said baseline value.

4. The invention of claim 1 wherein the comparator means includes a divider network for establishing said threshold.

5. The invention of claim 1 wherein the comparator means comprises a digital-to-analog converter which stores the threshold deviation from the immediately preceding marker.

6. A self-regulating detection system comprising:
   a current producing transducer;
   prescaler means for converting an ambient current from said transducer to a baseline value independent of the amplitude of the ambient current; and
   comparator means for comparing a deviation in the current from said transducer from the baseline value with the deviation from the baseline of the immediately preceding deviation and producing an output signal only when said deviation exceeds a fraction of said immediately preceding deviation.

7. The invention of claim 6 wherein said fraction is two-thirds.

8. The invention of claim 6 wherein said prescaler means comprises a multiplying digital-to-analog converter.

9. The invention of claim 8 wherein said prescaler means further comprises a ripple counter to supply the digital signal to said multiplying digital-to-analog converter.

10. The invention of claim 6 wherein said comparator means comprises a digital-to-analog converter circuit for storing said fraction of said immediately preceding deviation.

11. The invention of claim 10 wherein said comparator means further comprises a divider circuit for establishing said fraction to be stored in the digital-to-analog converter.

12. In a method of counting frames of microfilm wherein the microfilm moves through a light detecting system and wherein each frame has a marker thereon, the improvement comprising the steps of:

converting the output of the light detecting system from the unmarked portion of each microfilm frame to a baseline value independent of the quantity of light received by said detecting system;

measuring the deviation from the baseline value caused by the passing of a marker through said detection system;

comparing said deviation with a threshold based on the amount of deviation from the baseline of the next previous marker; and providing an output signal when said deviation exceeds said threshold.

13. A method of self establishing a variable threshold for detecting a marker on a microfilm frame wherein the microfilm moves through a light detecting system and wherein each frame has a marker comprising the steps of:

measuring the deviations in light caused by the passing of a marker through said detection system;

comparing said deviation in light with a threshold, said threshold being a function of the deviation in light produced by the immediately preceding marker;

providing an output signal when said deviation in light exceeds said threshold; and establishing a new threshold based on a fraction of the deviation of the marker which caused the output signal to be provided.

* * * * *